Figure 1:
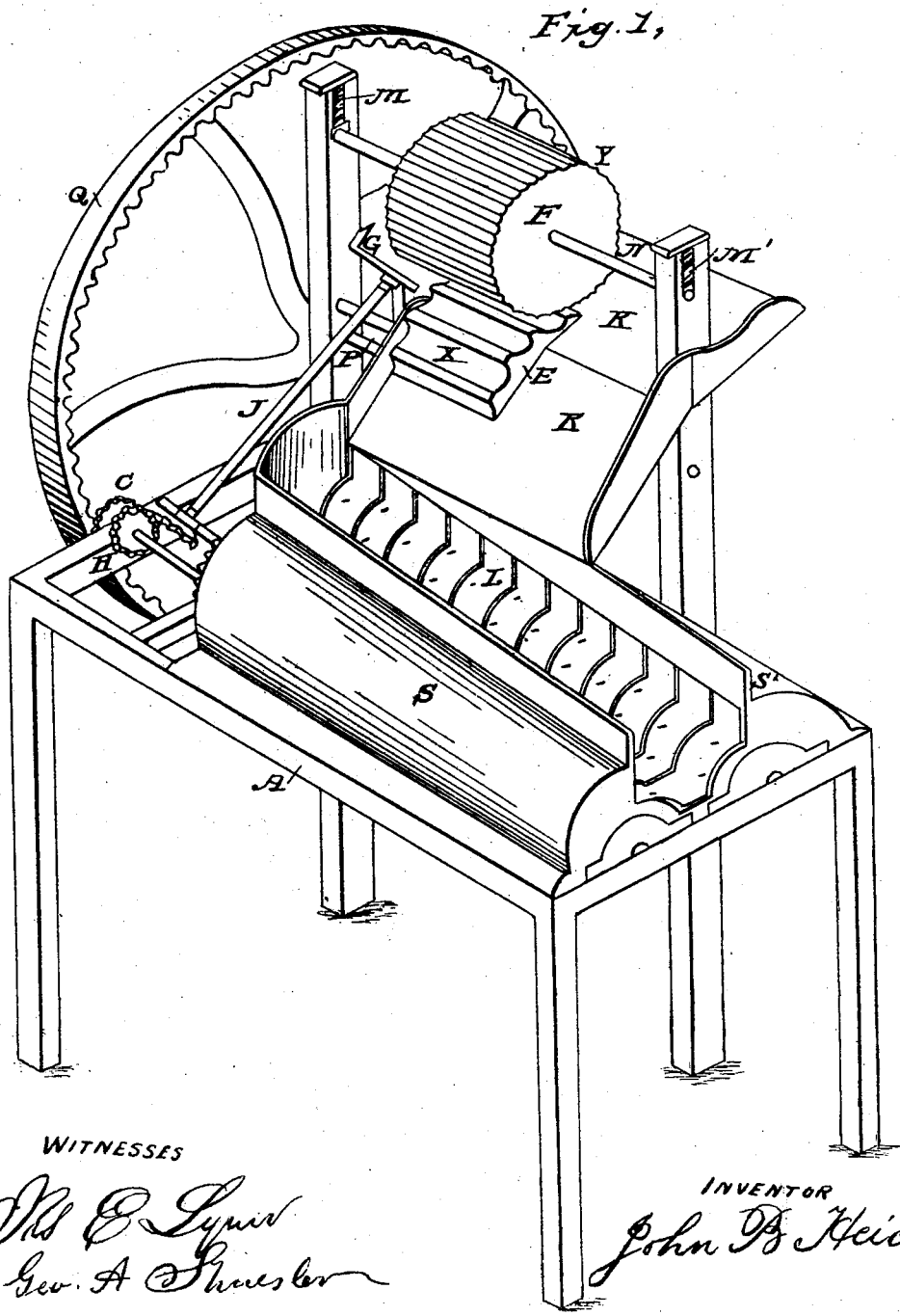

J. B. HEICH.
Corn Husker.

No. 18,396.

2 Sheets—Sheet 1.

Patented Oct. 13, 1857.

WITNESSES

INVENTOR
John B Heich

J. B. HEICH.
Corn Husker.
No. 18,396.
2 Sheets—Sheet 2.
Patented Oct. 13, 1857.
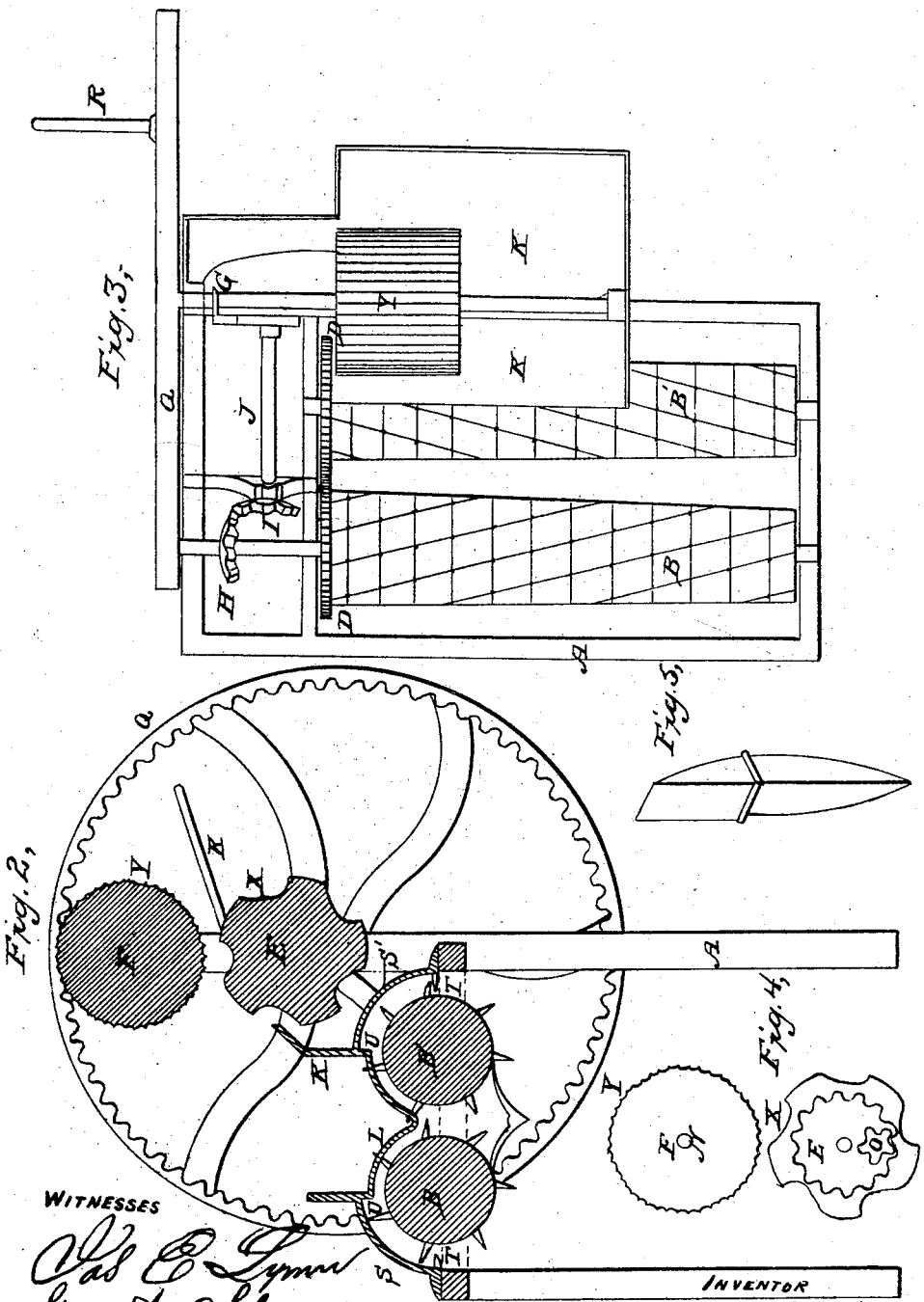

UNITED STATES PATENT OFFICE.

JOHN B. HEICH, OF CINCINNATI, OHIO.

CORN-HUSKER.

Specification of Letters Patent No. 18,396, dated October 13, 1857.

*To all whom it may concern:*

Be it known that I, JOHN B. HEICH, of Cincinnati, in the county of Hamilton and State of Ohio, have invented a new and Improved Machine for Husking Corn; and I do hereby declare that the following is a full, clear, and exact description of the construction and operation of the same, reference being had to the annexed drawings, making a part of this specification, in which—

Figure 1 is a perspective view; Fig. 2, a transverse section; Fig. 3, a plan; Fig. 4, the manner in which motion is applied to the roller E, and Fig. 5 a full sized view of the spikes in the tapering cylinders B B′.

A is the frame to the machine, and B, B′, tapering cylinders with spikes on their surfaces, the shape of which as shown in Fig. 5—arranged in parallel lines around their peripheries, and longitudinally in spiral lines verging inward. The cylinders and spikes being thus constructed and arranged so as to discharge the ears with facility to avoid the bruising of the kernals which would otherwise take place, and to tear the husk more thoroughly than any other mode of arrangement.

C is a cog on the spindle B, gearing into driving wheel Q, and imparting motion to the tapering cylinders B, B′, and D, D′ are cogs by which the tapering cylinders are turned in opposite directions.

E and F are rollers which hold the ears of corn fast while exposed to the action of the rotary knife G; the surface of E is fluted as shown in Figs. 1, 2, and 4 at X; F is also fluted as shown in the same figures at Y.

H is a beveled cog on the spindle of B, and gears into the beveled cog I, which is attached to the spindle J, which works the rotary knife G.

K is the inclined feeding board by which the rollers E and F are fed, and the ears after the nubs are cut off are delivered on the inclined grating L.

M and M′ are springs at each end of the spindle N, by means of which the upper roller F adjusts itself to any sized ear.

O is a pinion as shown in Fig. 4 gearing in cog at the side of E, thereby imparting motion to it, and is fixed on P the spindle of the driving wheel Q, which is moved by means of a crank R or otherwise.

S S′ is a convex frame fitting over the tapering cylinders B B′, having a row of spikes at T and U, between which, as well as the grating L, the spikes or tapering cylinders B B′ rotate.

V is a double rake the outside edges of which touch the tapering cylinders B, B′ and is fixed to the ends of the frame, with openings through which the spikes or tapering cylinders B B′ rotate and thus strip off the husk.

The operator stands in front of driving wheel Q, and as he turns the crank R gives motion to all the parts of the machine. As the crank turns motion is given to the roller E by means of the pinion O, and the corn guided by the edge of the inclined feeder K, which is on a line with the edge of roller E, rolls into the flutes of roller E, and is held fast by the roller F, which is rotated by the movement of the under roller impelled forward by the ear, and the butt is gradually cut off, the knife G revolving quicker than the ear. The butt in consequence of the angle at which the knife is placed is thrown off in a tangent, and the ear falls down the inclined feeder K into the grating L when the spikes acting through the grating L tear the husk off and pass it through the spikes on the under side of the convex frame S S′, when, being separated from the spikes by means of the rake V, it drops to the floor, and the husked ear is discharged clean from the grating into a basket or other receptacle.

What I claim as my invention and desire to secure by Letters Patent, is—

1. The feeding rollers E and F in combination with the inclined feeder K, and rotating knife G, when said parts are constructed and arranged in relation to each other, in the manner and for the purposes above set forth.

2. The convex frame S, S, and grating L, in combination with the inclined tapering cylinders B, B′, provided with teeth as described, and rake V, the whole constructed and arranged for joint operation as and for the purposes specified.

JOHN B. HEICH.

Attest:
 JAS. E. LYNN,
 GEO. A. SHUESLER.